(12) United States Patent
Boizard et al.

(10) Patent No.: US 8,804,498 B2
(45) Date of Patent: Aug. 12, 2014

(54) METHODS FOR SENDING AND PROCESSING AN SIP RESPONSE

(75) Inventors: Stéphane Boizard, Fronton (FR);
Sébastien Prouvost, Toulouse (FR);
Olivier Cleuziou, Ivry sur Seine (FR)

(73) Assignee: Orange, Paris (FR)

( * ) Notice: Subject to any disclaimer, the term of this patent is extended or adjusted under 35 U.S.C. 154(b) by 31 days.

(21) Appl. No.: 13/513,535

(22) PCT Filed: Dec. 2, 2010

(86) PCT No.: PCT/FR2010/052597
§ 371 (c)(1),
(2), (4) Date: Jun. 1, 2012

(87) PCT Pub. No.: WO2011/067540
PCT Pub. Date: Jun. 9, 2011

(65) Prior Publication Data
US 2012/0250497 A1    Oct. 4, 2012

(30) Foreign Application Priority Data

Dec. 4, 2009 (FR) ..................... 09 58666

(51) Int. Cl.
*H04L 12/26* (2006.01)
*H04L 12/56* (2006.01)
(52) U.S. Cl.
CPC ............ *G04L 65/1006* (2013.01); *H04L 45/28* (2013.01)
USPC ............ 370/221; 370/217; 370/225; 370/250
(58) Field of Classification Search
USPC ........... 370/218, 221, 225, 342, 352; 709/227
See application file for complete search history.

(56) References Cited

U.S. PATENT DOCUMENTS

| 7,821,923 | B2 * | 10/2010 | Kakadia et al. | 370/221 |
| 8,014,299 | B2 * | 9/2011 | Van Bemmel | 370/242 |
| 2007/0019634 | A1 * | 1/2007 | Fisher et al. | 370/352 |
| 2008/0013447 | A1 * | 1/2008 | Lauber | 370/225 |
| 2008/0098117 | A1 * | 4/2008 | Fukuhara et al. | 709/227 |
| 2009/0196183 | A1 | 8/2009 | Kakadia et al. | |

FOREIGN PATENT DOCUMENTS

| EP | 1528818 | 5/2005 |
| WO | 2009086935 | 7/2009 |

OTHER PUBLICATIONS

International Search Report for International Application No. PCT/FR2010/052597 dated Mar. 24, 2011.

* cited by examiner

*Primary Examiner* — Brian D Nguyen
*Assistant Examiner* — Toan Nguyen
(74) *Attorney, Agent, or Firm* — Knobbe Martens Olson & Bear LLP

(57) ABSTRACT

Devices, systems, and methods for sending and processing session initiation protocol (SIP) responses are disclosed. According to one aspect, a method for sending an SIP response through a first telecommunications network node is described. The method includes receiving, by means of the first node, a SIP request sent by means of a second node of the network. The method includes detecting an event that interferes with processing of said request by means of the first node. The method further includes sending, to the second node, a SIP response notifying said interference. The method also includes, before the sending step, activating, within the SIP response, a parameter that allows the request to be rerouted, said parameter being configurable by means of the second node.

15 Claims, 4 Drawing Sheets

METHODS FOR SENDING AND PROCESSING AN SIP RESPONSE

RELATED APPLICATIONS

This application is a U.S. National Phase of International Application No.: PCT/FR2010/052597, filed Dec. 2, 2010 which claims the benefit of French Patent Application No. 09 58666 filed Dec. 4, 2009, each of which is incorporated by reference in their entirety.

BACKGROUND

1. Field

The present invention relates generally to the field of telecommunications.

2. Background

It relates more particularly to the processing of a request conforming to the Session Initiation Protocol (SIP protocol), sent over a telecommunication network, and passing through a plurality of nodes of the network to a recipient, one of these nodes having detected an event obstructing it from processing the request and therefore from transmitting it to the next node.

In the sense of the invention, a node of an SIP network designates any entity of this network capable of routing an SIP request (i.e. conforming to the SIP protocol) to its destination. Such a node will preferably be a physical network element.

While the present invention is described herein in connection with certain embodiments, it is to be understood that the invention is not limited to the disclosed embodiments, but, on the contrary, is intended to cover various modifications and equivalent arrangements included within the spirit and scope of the appended claims, and equivalents thereof.

Thus, the invention has a preferred, but not limiting, application in the context of voice-over-IP (VoIP) networks based on the SIP protocol or, for example, with an IMS (Internet Multimedia Subsystem) network.

An event or a situation obstructing a node of the network from processing an SIP request designates, for example, a lack of resources on that node, a congestion or a break of its links to the downstream nodes of the network on the path identified for the request, etc. Hereinafter in the description, the terms downstream and upstream will be used with reference to the path taken by the request, in the request source to request destination direction.

Now, it may be that there are other paths in the network for this same request, that is to say, paths which arrive at the same recipient but pass through different nodes. Consequently, it may be useful for a node upstream of the node having detected the obstruction (hereinafter designated "node down") to try an alternative path: this is referred to as rerouting of the request.

In the current SIP networks, when an intermediate node A0, present on the path of an SIP call request, is in a state of temporary congestion or maintenance, it may be configured so as to send to the node A1, preceding it on the path, a failure response 503 "Service Unavailable". This message is defined in more detail in the document RFC 3261 entitled "SIP: Session Initiation Protocol", published by the IETF.

According to the SIP protocol, upon the reception of a failure response 503, the node A1 must try to reroute the SIP call request to a node other than the node A0. If the node A1 does not find on its level other nodes enabling the SIP call request to be routed to its recipient (either because there are none, or because said nodes are also down), a rerouting of the request is then undertaken by a node A2 located upstream of the node A1, then a node A3, etc.

Now, it may be that there is no rerouting that allows the call request to be routed to its recipient, regardless of the level at which it is undertaken in the path. This situation is called ineffective rerouting.

There may be many such ineffective reroutings depending on the topology of the network which are, because there are many, detrimental to the correct operation of the telecommunication network. They are in fact the cause of an unnecessary network load, which may be considerable and costly to other calls.

For example, with reference to FIG. 1, in a configuration in which an SIP call request sent by a calling party (CALLER) has to pass through four nodes to reach its recipient (CALLEE) and the fourth node N4 sends a failure response 503 "Service Unavailable", the preceding nodes are each in turn, on reception of this failure response, likely to try an ineffective rerouting of the request. In the example represented in FIG. 1, this gives rise to four successive sendings of the request (transitions 4, 8, 14, 18), which result in four failure responses (transitions 5, 9, 15, 19) sent by the fourth node N4 before the failure of the call is notified to the calling party (transition 22). In other words, the network load resulting from a single SIP request, ultimately ineffective in this configuration, is multiplied by four on the fourth node.

It will therefore be clearly understood that the multiple rerouting attempts undertaken in the SIP network can not only substantially increase the unnecessary load in the network but also the congestion of the nodes already down.

Moreover, the SIP protocol, in its current version, allows the rerouting of a call request only in very limited cases of obstruction of the node from processing the call request, and following the sending of a failure response 503. Now, notably because of the multiplication of the ineffective reroutings that can be encountered in the context of the use of this failure response, said failure response is ultimately little used by the telecommunication network operators.

SUMMARY OF CERTAIN INVENTIVE ASPECTS

The aim of the present invention is notably to overcome the abovementioned drawbacks.

Advantageously for this purpose, it proposes activating a parameter in the responses returned by a node that is down on the SIP network (typically in a failure response), so as to control the rerouting of the requests in the network.

Thus, the invention relies on the one hand on a method for sending a response notifying an obstruction to processing an SIP request by a node, and on the other hand on a method for processing this notification response by the node receiving it, in other words interpreting the parameter activated in this response.

According to a first aspect, the invention therefore targets a method for sending an SIP response by a first node of a telecommunication network, comprising:
  a step of reception by the first node of an SIP request sent by a second node of the network;
  a step of detection of an event obstructing a processing of this request by the first node;
  a step of sending, to the second node, an SIP response notifying this obstruction.

This method is noteworthy in that also comprises, before the sending step, a step of activation, in the SIP response, of a parameter authorizing a rerouting of the request, and which can be configured by the second node.

Correlatively, the invention also targets a device for sending an SIP response in a telecommunication network comprising:

means for receiving an SIP request sent by a second device of the network;
means for detecting an event obstructing a processing of this request by the sending device;
means for sending, to the second device, an SIP response notifying this obstruction.

The sending device according to the invention is noteworthy in that it also comprises means for activating, in the SIP response, before it is sent to the second device, a parameter authorizing a rerouting of the request, and which can be configured by the second device.

Thus, the invention no longer proposes, as in the current state of the art, associating with a particular failure response, namely a response 503 "Service Unavailable", a possibility of rerouting the request. However, it does propose activating in the response message sent by the node having detected an obstruction to processing the call request (that is to say, in the failure response), in addition to the usual information notifying the reason for the obstruction, an additional parameter indicating that a rerouting of the request, by the node immediately upstream in the path of the request and receiving this message, is authorized and possible.

It will be noted that the term parameter should be considered here in its general sense, in that it designates a rerouting indicator, or in other words, an item indicating that a rerouting is authorized. It may be an SIP parameter as defined in the document RFC 3261 entitled "SIP: Session Initiation Protocol", published by the IETF, but it may also be conveyed by an SIP header, by an SIP header field, by an item in the body of the SIP response, etc.

Furthermore, in the sense of the invention, the expression activation of a parameter should be understood to mean:

the insertion of this parameter in the SIP response, so that a node receiving this message and capable of interpreting the parameter identifies that a rerouting of the request is authorized by virtue of the simple presence of this parameter in the response; and/or
the setting of this parameter to a predetermined value, interpreted by the node as authorizing the rerouting.

The terms activated or active, and deactivated or inactive, will be used interchangeably to designate the state of the parameter in the response.

This parameter can advantageously be configured (i.e. activated or deactivated, have its value modified, be kept in its current state, etc.) by the second node, in other words by the node, or equivalently, by the device, receiving the SIP response containing the parameter.

The invention thus offers a greater degree of flexibility in terms of rerouting than the mechanisms currently implemented in the SIP protocol.

This is because, on the one hand, the possibility of rerouting is no longer limited to a particular cause of obstruction, or to the choice of a particular type of response notifying the obstruction (SIP failure response 503).

Also, the use of a configurable parameter in the response advantageously makes it possible to easily activate and deactivate the possibility of rerouting by a node receiving this response, which is not currently allowed by the SIP protocol.

In practice, in the current SIP networks, when a node receives a failure response 503, it cannot change the type thereof before transmitting it to the preceding nodes. Consequently, each node of the path receives the failure response 503 and, on reception of this response, can attempt a rerouting of the call request. The invention offers the freedom of being able at any time to suppress this possibility, and limit the rerouting of the request to the node immediately preceding the node that is down in the path of the request.

The invention is thus of particular interest in the SIP networks in which the routings are complex between a source node (caller) and a destination node (callee), that is to say, in particular, in the networks in which the number of intermediate nodes crossed by an SIP request is large (i.e. greater than 2) and the paths that can be taken by the request are multiple. It makes it possible, in these networks, to limit the number of ineffective reroutings, by the implementation of an appropriate processing by the node receiving the message including the parameter authorizing the rerouting.

In a particular embodiment of the invention, the sending method also comprises, after the detection step, a step of verification of the validity of at least one predetermined criterion.

Thus, the rerouting of the request can be conditioned on the one hand, by the detection of an event or of a situation obstructing a node of the network from processing the SIP request, and on the other hand, by additional criteria linked, for example, to the cause or to the nature of the obstruction. The choice to authorize the rerouting therefore falls to the node having detected the obstruction.

In particular, the parameter will be able to be activated (for example inserted) in the response notifying the obstruction only if the latter is due to a fault affecting only the first node (lack of resources, congestion, maintenance on the first node, etc.) and not all the nodes located downstream and leading to the recipient of the request.

As a variant, it is also possible to consider a criterion linked to the capacity of the node upstream in the path, to which the SIP response is sent (second node), to process the parameter located in this response.

In this way, if the second node is not able to interpret the parameter as authorizing a rerouting (for example because it has not yet been updated), the second node will not receive this parameter and, because of this, will not transfer it to nodes upstream in the path. These nodes, not receiving a response including this parameter, will not attempt to reroute the request, whether or not they are designed to interpret the parameter.

In a particular embodiment, the validity of the criterion linked to the capacity of the second node to process the parameter is checked by using an indication contained in the SIP request and an identifier of the second node.

Thus, advantageously, each node through which the SIP request passes can insert, into the request, an indication according to which it is designed to interpret the parameter, and an identifier, such as its IP address. Such an indication can, for example, be inserted into the "Supported" header of the SIP request, known to those skilled in the art. The first node can then check that this indication does indeed emanate from the second node, that is to say, from the node positioned immediately upstream on the path of the request, by comparing the identifier located in the request and the identifier of the second node for which it receives the request (present notably in the "Via parameter received" header). If the criterion is not checked, in other words, if the second node is not designed to interpret the parameter, the first node does not activate the parameter in the SIP response, so as to avoid any ineffective rerouting by a node upstream of the second node.

In a particular embodiment, a value of the parameter activated in the response depends on a cause of the obstruction.

In this way, it is possible to inform the second node, so that it can judge the relevance of a rerouting of the SIP request to different potential candidates.

According to a second aspect, the invention also targets a method for processing an SIP response, implemented by a first node of a telecommunication network after having transferred, to a second node of the network, an SIP request received from a third node, the response being received from the second node and notifying the first node of an obstruction to a processing of the request by the second node. The method according to the invention is noteworthy in that it comprises:

if the response received from the second node contains an activated (or active) parameter authorizing a rerouting of the request and which can be configured by the first node:
- a step of searching for at least one fourth node to which to reroute the request;
- a step of rerouting the request to said at least one fourth node, where appropriate; and
- if the first node is notified of an obstruction to a processing of the request by said at least one fourth node, a step of sending, to the third node, an SIP response notifying the latter of an obstruction to a processing of the request, in which the parameter is deactivated;

otherwise, a step of transferring the response received from the second node to the third node.

Correlatively, the invention also targets a device for processing an SIP response of a telecommunication network, suitable for processing said response after having transferred, to a second device of the network, an SIP request received from a third device, said response being received from the second device and notifying said processing device of an obstruction to a processing of the request by the second device, said processing device being characterized in that it comprises:

means, activated if the response received from the second device contains an activated parameter authorizing a rerouting of the request and which can be configured by said first device:
- for searching for at least one fourth device to which to reroute the request;
- for rerouting the request to said at least one fourth device, where appropriate; and
- means, activated if, in addition, the processing device is notified of an obstruction to a processing of the request by said at least one fourth device, for sending, to the third device, an SIP response notifying the latter of an obstruction to a processing of the request, in which the parameter is deactivated;

means activated otherwise, for transferring the response received from the second device to the third device.

Thus, the invention makes it possible to limit the rerouting to the first level upstream of the node having detected an obstruction to processing the request. Preferentially, any node receiving an obstruction notifying SIP response in which the parameter is deactivated (for example, an SIP response not containing this parameter), will not attempt to reroute the SIP request.

Because of this, if the first node does not have any alternative route or if the attempt of rerouting fails, then it will return an SIP response notifying obstruction by deactivating the routing capability indication (for example, by deleting it from the response that it has received from the second node). The third node receiving this SIP response, will not attempt any rerouting. In this way, the ineffective reroutings and an unnecessary load in the network are limited.

The inventors have also found that such a strategy in terms of rerouting yielded performance levels similar to, even better than, those yielded today when it is possible to reroute the request at all the levels, and with a much lesser complexity.

In a particular embodiment of the invention, if the search step fails to identify a fourth node, the processing method also comprises:
- a step of deactivation of the parameter in the response received from the second node; and
- a step of sending the duly modified response to the third node.

In a variant embodiment, when the response received from the second node contains the activated parameter, the processing method also comprises a step of checking the validity of at least one predetermined criterion, and, if said at least one criterion is valid, a step of sending, to the third node, an SIP response notifying the latter of an obstruction to a processing of the request in which the parameter is activated.

There is therefore still a possibility of attempting a rerouting by the third node in certain situations, such as, for example, when the SIP response comes from a particular node, or when the search step fails to identify a fourth node. In other words, in these situations identified by predetermined criteria, the parameter authorizing the rerouting is not deactivated by the first node in the SIP response, before it is transmitted to the upstream node (third node).

In the abovementioned example where the search step fails to identify a fourth node (i.e., the first node does not have any alternative path for the request), the third node will be able to undertake a rerouting of the SIP request, on reception of the SIP response. However, the cascade rerouting can again be avoided, given that the first node does not have an alternative route and therefore has not itself undertaken any rerouting attempt. It will suffice for this for the third node, in case of ineffective rerouting(s), to deactivate the parameter contained in the SIP response before transmitting it to the upstream nodes.

It will be noted, according to the invention, that a node receiving an SIP response notifying an obstruction to processing the request in which the parameter is deactivated or inactive (in other words, in which it does not exist or it has a value indicating that a rerouting is not authorized), will not attempt any rerouting, but will return this SIP response as received to the upstream node.

According to a third aspect, the invention targets a system of a telecommunication network comprising at least one source element and one destination element capable of exchanging an SIP request, and a plurality of intermediate nodes through which this request passes between the source element and the destination element, said system being characterized in that at least one of the intermediate nodes of the system is a device for sending an SIP response notifying an obstruction to processing the request according to the invention and at least one of the intermediate nodes of the system is a device for processing this response according to the invention.

The system according to the invention thus makes it possible to limit the ineffective reroutings in the network, and has the same advantages as the processing device and the sending device according to the invention.

In a particular embodiment, at least intermediate nodes comprise means for inserting into the SIP request an indication relating to its capacity to process the parameter, these means being activated before the sending of the request to another intermediate node, this intermediate node being a device for sending an SIP response according to the invention also comprising means, activated after the detection of an event obstructing the processing of the request, for checking the validity of a criterion linked to this capacity.

In another particular embodiment, the source element comprises means, activated if it receives an SIP response containing said activated parameter:
- for searching for at least one intermediate node to which to reroute the request;
- for rerouting the request to said at least one intermediate node, where appropriate; and
- means, activated if the source element is also notified of an obstruction to a processing of the request by said at least one intermediate node, for notifying a failure to process the request.

Thus, the invention also targets a method for processing an SIP response, implemented by a source element of a telecommunication network, that is the cause of an SIP request transmitted by the source element to a node of the network, the SIP response being received from this node and notifying the source element of an obstruction to a processing of the request by the node. According to the invention, this processing method is noteworthy in that it comprises, if the response contains an activated parameter authorizing a rerouting of the request:
- a step for searching for at least one other node to which to reroute the request;
- a step for rerouting the request to said at least one other node, where appropriate; and
- if the source element is notified of an obstruction to a processing of the request by said at least one other node, a step of notifying a failure to process the request.

The notification of the failure to process the request can be given, for example, to the user of the source element. As a variant, if the source element is a protocol interworking entity, this notification may be made by the interworking of the processing obstruction response to another protocol.

According to a fourth aspect, the invention also targets a signal comprising an SIP response notifying an obstruction of a first node to processing an SIP request sent by a second node, noteworthy in that this SIP response contains a parameter authorizing the rerouting of the request, and which can be configured by the second node.

In a particular embodiment, the different steps of the sending method and of the processing method are determined by computer program instructions.

Consequently, the invention also targets a computer program on an information medium, this program being likely to be implemented in a sending device, or more generally in a computer, this program comprising instructions designed to implement the steps of a method for sending an SIP message as described above.

The invention also targets a computer program on an information medium, this program being likely to be implemented in a processing device, or more generally in a computer, this program comprising instructions designed to implement the steps of a method for processing an SIP message as described above.

Each program can use any programming language, and be in the form of source code, object code, or intermediate code between source code and object code, such as in a partially compiled form, or in any other desirable form.

The invention also targets a computer-readable information medium, comprising instructions of a computer program as mentioned above.

The information medium may be any entity or device capable of storing the program. For example, the medium may comprise a storage means, such as ROM, for example a CD ROM or a microelectronic circuit ROM, or even a magnetic storage means, for example a diskette (floppy disk) or hard disk.

Also, the information medium may be a transmissible medium such as an electrical or optical signal, which can be routed via an electric or optical cable, by radio or by other means. The program according to the invention can in particular be downloaded over a network of internet type.

Alternatively, the information medium may be an integrated circuit in which the program is incorporated, the circuit being designed to execute or to be used in the execution of the method concerned.

It will be noted that it is also possible to envisage, in other embodiments, having the sending method, the processing method, the sending device, the processing device and the system according to the invention offer, in combination, all or some of the above mentioned features.

BRIEF DESCRIPTION OF THE DRAWINGS

Other features and advantages of the present invention will emerge from the description given below, with reference to the appended drawings which illustrate an exemplary embodiment thereof that is in no way limiting. In these figures.

DETAILED DESCRIPTION OF CERTAIN ILLUSTRATIVE EMBODIMENTS

Figure 1:
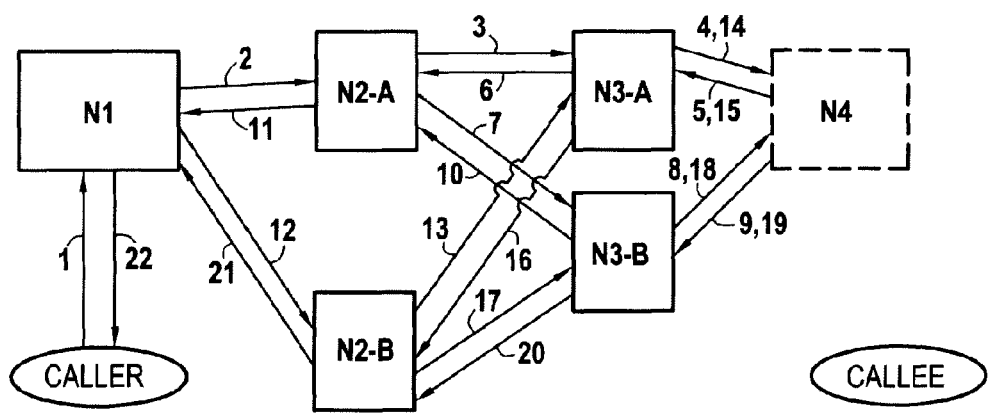
FIG. 1, already described, represents an example of a plurality of ineffective reroutings of an SIP request undertaken in a telecommunication network.
Figure 2:
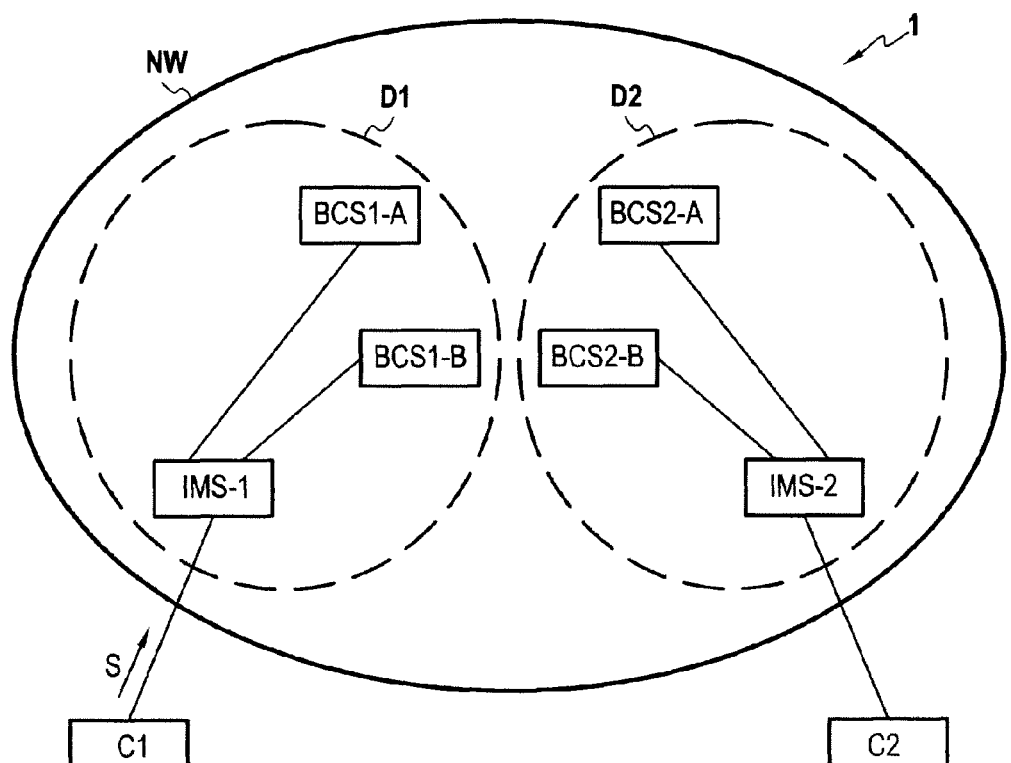
FIG. 2 represents an example of a system of a telecommunication network according to the invention, in a particular embodiment.

FIG. 2 represents, in its environment, a system 1 of a telecommunication network NW according to the invention, in a particular embodiment.

The network NW is a voice-over-IP (VoIP) network, relying on the SIP signaling protocol. This protocol is known to those skilled in the art and will not be described in more detail here. More comprehensive information on the SIP protocol can be obtained from the document RFC 3261, entitled "SIP: Session Initiation Protocol" and published by the IETF.

In the example envisaged here, the network NW has an architecture constituting of a number of distinct domains, namely the domains D1 and D2. Generally, a domain is an independent telecommunication (sub)network, for example, a VoIP network managed by a fixed telephony operator or by a mobile telephony operator, etc.

The domains D1 and D2 both rely here on an IMS (IP Multimedia Subsystem) architecture, as specified in the 3GPP and TISPAN standardization standards. As is known, such an architecture is based on an IMS network core (also called IMS core network) which comprises a number of functional entities such as, for example, a CSCF (Call Session Control Function) entity, a BGCF (Breakout Gateway Control Function) entity, and application servers. These entities are described in more detail in the TISPAN document entitled "ES 282 007 IP Multimedia Subsytem (IMS): Functional architecture NGN IMS Architecture", ETSI, Technical Report, 2006.

Thus, each domain D1 and D2 comprises an IMS core network, respectively denoted IMS-1 and IMS-2, as well as a plurality of client terminals (for example the terminals C1 and C2), that can connect to the domains D1 and D2 via the core networks IMS-1 and IMS-2 by various access networks.

The domains D1 and D2 are also linked together and to the external domains (for example to the internet public network), by so-called edge elements. In the example described here, for reasons of simplicity, there will a limit of two edge elements per domain, namely BCS1-A, BCS1-B for the domain D1 and BCS2-A, BCS2-B for the domain D2. To reach the external domains, the edge elements BCS1-A and BCS1-B can be used without distinction in the domain D1 from the core network IMS-1. Similarly, the edge elements BCS2-A and BCS2-B can be used without distinction in the domain D2 from the core network IMS-2.

It will be noted that the example described here is given only as an illustrative example and is in no way limiting. The invention in fact applies to other network architectures, notably consisting of a single domain or more than two domains, managed or not by the same operator. Furthermore, these domains can have a different architecture, and it is possible to consider a different number of edge elements and/or IMS elements, as well as other types of elements.

As is known in an SIP network, an SIP request sent by a source element to a destination element is conveyed by a signal which passes through numerous nodes (i.e. elements) of the network.

Some of these nodes have functions that are important to carry out on the SIP request, such as for example the supply of supplementary services such as the presentation of the source element name. Other nodes have purely transit or protocol interworking roles, without actual added value to the service, beyond the routing of the request and this interworking function. It will easily be understood that these nodes can be replaced by other nodes having identical or similar functions.

In the example envisaged here, the edge elements BCS1-A, BCS1-B, BCS2-A, BCS2-B and the core networks IMS-1 and IMS-2 are nodes of the system 1 of the telecommunication network NW, through which passes an SIP request sent, for example, by the client terminal C1 (source element in the sense of the invention) to the client terminal C2 (destination element in the sense of the invention). In other words, they are entities of the network NW that are capable of routing an SIP request to its destination. Hereinafter in the description, the terms node, element or device will be used without distinction to designate the entities BCS1-A, BCS1-B, BCS2-A, BCS2-B, IMS-1 and IMS-2.

For reasons of simplicity, the description of the invention will be limited to these six nodes. However, obviously, other nodes could be considered, and, in particular, more of them.

Furthermore, in the example envisaged here, it is assumed that each of these elements, or nodes, is both a sending device and a processing device according to the invention. This assumption is not, however, in any way limiting. The invention also applies from the moment that at least two nodes used in succession by the request are respectively a processing device and a sending device according to the invention.

Figure 3:
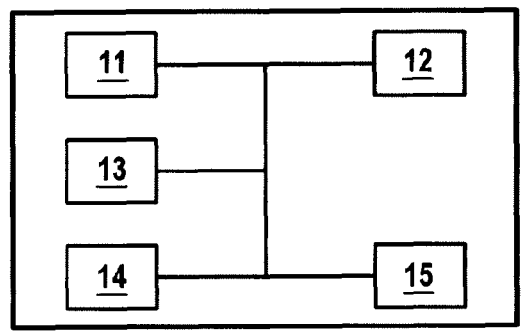
FIG. 3 represents the hardware architecture of a node of the system represented in FIG. 2.

Each element of the system 1 (i.e. BCS1-A, BCS1-B, BCS2-A, BCS2-B, IMS-1 and IMS-2) here has the hardware architecture of a computer, as represented in FIG. 3.

Thus, each element of the system 1 notably comprises a processor 11, means 12 of communication with the other elements of the network NW, and possibly with elements external to the network, a ram memory 13, a rom memory 14, and a nonvolatile rewritable memory 15.

The rom memory 14 contains a computer program according to the invention, designed to execute the main steps of the sending method according to the invention represented in FIG. 5 and described later, as well as a program according to the invention, designed to execute the main steps of the processing method according to the invention represented in FIG. 6 described later.

The rewritable memory 15 here comprises a routing table in the network NW. This routing table identifies the node or nodes to which the element can route an SIP request that reaches it. Such a table is known to those skilled in the art and will not be described in more detail here. It can be predefined according to the topology of the network, or, as a variant, be determined and updated using a dynamic procedure relying, for example, on network announcements sent by the various nodes of the network.

Figure 4:
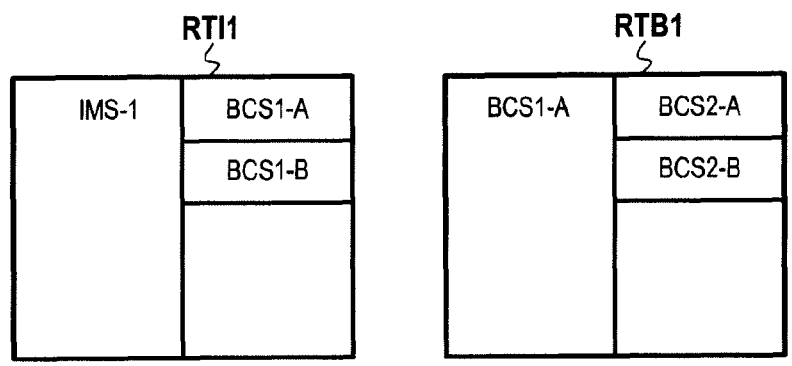
FIG. 4 represents an example of routing table extracts.

Examples of routing table extracts are given in FIG. 4, for the elements IMS-1 (table RTI1) and BCS1-A (table RTB1). In the interests of simplicity, only the nodes to which to route the requests in the direction C1 to C2 have been represented. Thus, according to these examples:

the core network IMS-1 can route an SIP request reaching it from a client C1 to the edge elements BCS1-A and BCS1-B; and the edge element BCS1-A can route an SIP request reaching it from the core network IMS-1 to the edge elements BCS2-A and BCS2-B.

Figure 5:
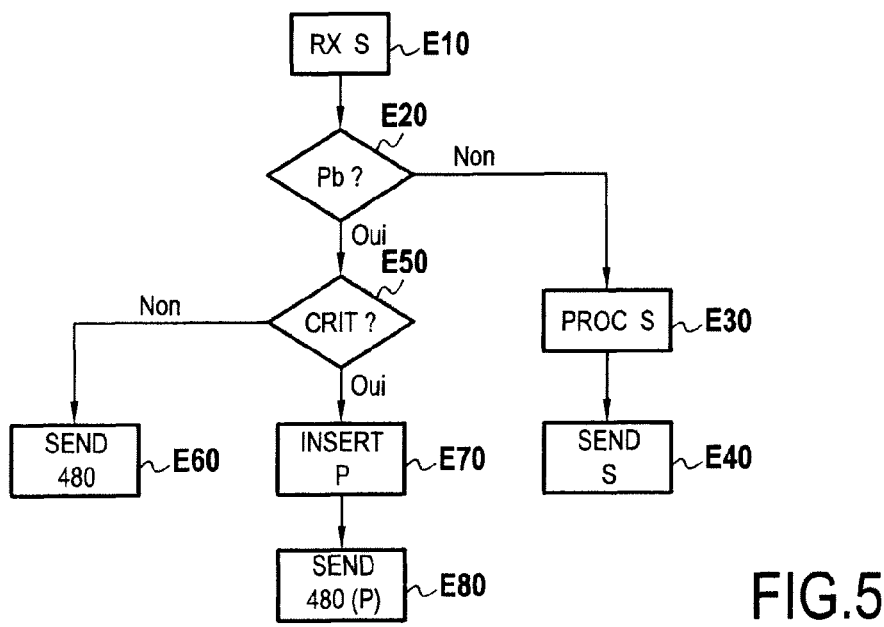
FIG. 5 represents, in flow diagram form, the main steps of the method for sending an SIP response according to the invention, in a particular embodiment, and when it is implemented by a node of the system represented in FIG. 2.
Figure 6:
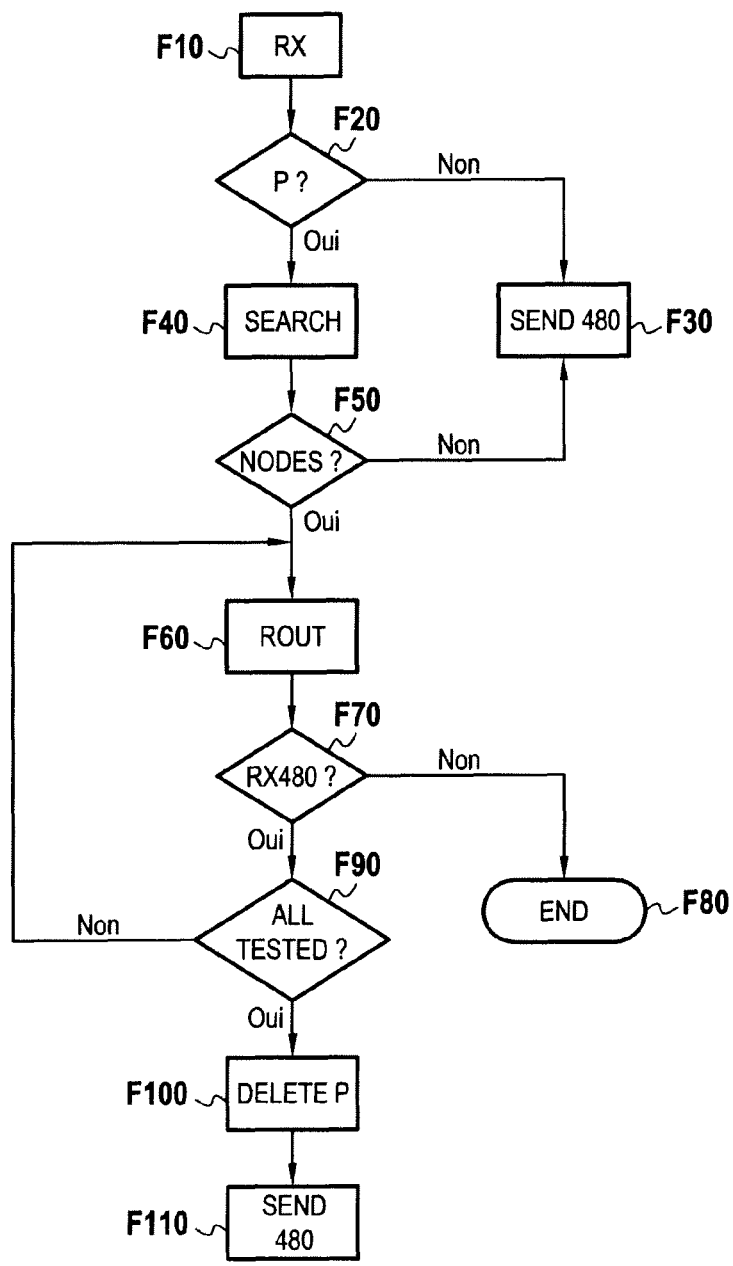
FIG. 6 represents, in flow diagram form, the main steps of the method for processing a message according to the invention, in a particular embodiment, and when it is implemented by a node of the system represented in FIG. 2.
Figure 7:
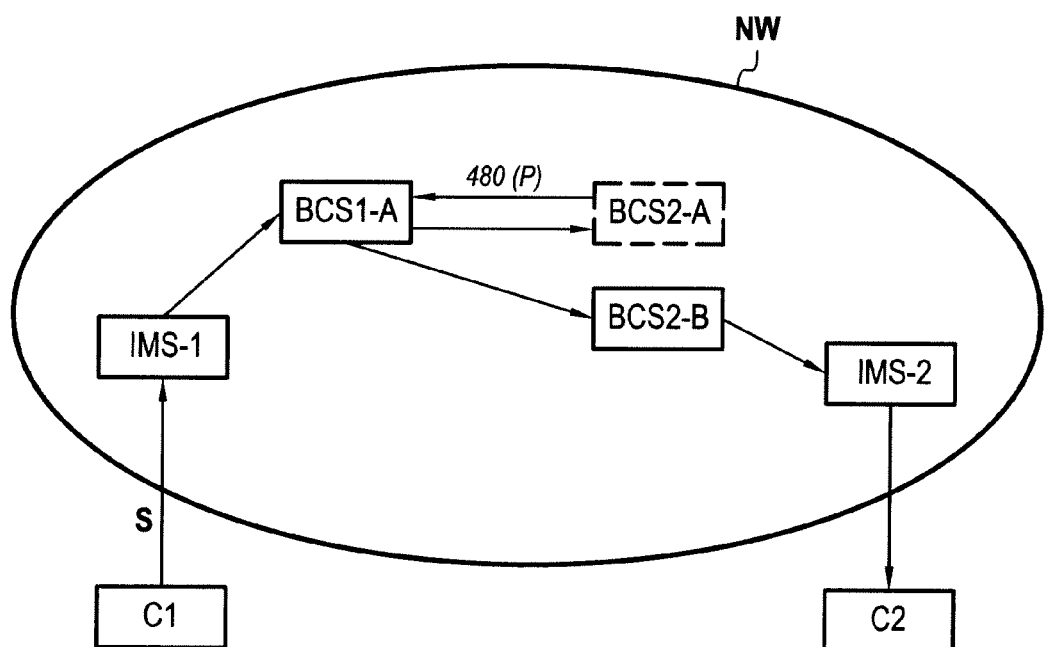
FIG. 7 illustrates an exemplary application of the invention.

There now follows a description, with reference to FIGS. 5, 6 and 7, of the main steps of a sending method and of a processing method according to the invention, when they are implemented by elements of the system represented in FIG. 2, in a particular embodiment of the invention.

It is assumed, in the example represented in FIG. 7, that the edge element BCS2-A is temporarily overloaded: it is therefore not able to process an SIP request reaching it, and consequently transmit it to the next node for routing to its recipient. On the other hand here, there is no event obstructing the other elements from processing the SIP requests that they receive.

It is also assumed that an SIP call request S is sent by the client terminal C1 to the client terminal C2, C1 and C2 here being cell phones. This request S is an INVITE call setup request. Obviously, the invention also applies to any type of SIP request, whether it is notably a dialogue opening request (e.g. INVITE or SUBSCRIBE), a request opening a transaction in a dialogue (e.g. ACK or BYE) or a request opening a transaction not linked to a dialogue (e.g. OPTION).

The request S first passes through the node IMS-1. On reception of this request S (step E10), the node IMS-1 checks its capacity to process it (step E20). Then it executes the functions that are associated with it on the request S, and stores a copy of the request S in memory, possibly modified (step E30).

In the interests of simplicity hereinafter in the description, the term request S will be used without distinction to designate the request initially sent by the client C1, and any request obtained following the application of the functions associated with the nodes through which the request S passes.

After consulting its routing table RTI1, the node IMS-1 transmits the request S to the next node, namely the edge element BCS1-A (step E40). It will be noted that the selection of a node from a plurality of candidate nodes for the routing and contained in a routing table is known to those skilled in the art and will not be described in more detail here.

Similarly, on reception of the request S (step E10), the node BCS1-A checks its capacity to process it (step E20), where appropriate executes the functions which are associated with it, then stores a copy of the duly obtained request S in memory (step E30). After consulting its routing table RTB1, it transmits the request S to the next node, namely the edge element BCS2-A (step E40).

This request S is then received by the node BCS2-A (step E10), temporarily overloaded.

On reception of the request S, the node BCS2-A examines its resources and detects that it does not have sufficient resources to process the request S (step E20). For example, because of an excessive number of requests to be processed, its CPU processor is overloaded (event obstructing the processing of the request in the sense of the invention).

As a variant, other events or situations may obstruct the processing of a request by the node BCS2-A. For example, the latter may detect that all its IP resources are taken by other requests, or that the physical line to be taken to transmit the request S to the next node is unusable.

According to the SIP protocol, the node BCS2-A prepares to send a failure response (or error response) to the node BCS1-A, located immediately upstream of the node BCS2-A in the path taken by the request S and that sent it the request S, in order to notify it of its obstruction. It is assumed here that this failure response is a request "480 Temporarily Unavailable". It constitutes an SIP response notifying an obstruction in the sense of the invention. Obviously, other failure or error responses specified by the SIP protocol could be envisaged, such as, for example, the failure response 503.

Advantageously according to the invention, the node BCS2-A first activates, in the failure response 480, a parameter denoted P, indicating that a rerouting by the node BCS1-A (and more generally by any node receiving the response in which the parameter P is activated), is authorized.

The activation of the parameter P in the failure response is here conditioned by the verification of at least one additional criterion in addition to the detection of an event obstructing the processing of the request S (step E50). It is a criterion c linked to the capacity of the node BCS1-A to which the failure response is sent to interpret and to process the parameter P. As a variant, other criteria may be checked, such as, for example, a criterion linked to the nature of the obstruction, etc.

In the example envisaged here, advantageously, when a node of the path taken by the request S can interpret and process the parameter P according to the invention, in other words, when it implements the processing method according to the invention, it inserts into the request S, before transmitting it to the next node (i.e., before the step E40), an identifier (such as its IP address), as well as an indication according to which it is capable of processing the parameter P.

This identifier and this indication are here inserted into the "Supported" header of the request. As is known to those skilled in the art, this header indicates, using specific identifiers also called option tags, predefined with the IANA (Internet Assigned Number Authority), the different services supported by the nodes through which the request passes. A description of the headers and of the option tags already declared with the IANA is presented in the document RFC 3261.

As a variant, they may be the subject of a new header of the SIP request.

Thus, in the example envisaged here, the nodes IMS-1 and BCS1-A have inserted, into the "Supported" header of the request S, their IP address as well as an indication according to which they are capable of processing the parameter P.

In order to determine whether the criterion c is checked, the node BCS2-A firstly looks to see if the request S includes an indication according to which a node of the path taken hitherto by the request S implements the processing method according to the invention.

If necessary, the node BCS2-A compares the identifier of the node or nodes associated with this indication, namely here, the IP address of the node BCS1-A and the IP address of the node IMS-1, with the identifier of the node for which it has received the request, and which is present, according to the SIP protocol, in the "Received" parameter of the "Via" header of the request S. The aim of this comparison is to dynamically detect, before authorizing a rerouting, whether the node having indicated its capacity to process the parameter P is indeed the node directly upstream of the node BCS2-A, that is to say, the one which sent it the request S. In this way, there is a safeguard against the situation in which an intermediate node, not conforming to the invention, would be located between the node BCS2-A and the node BCS1-A, and could only transparently retransmit the request S (in other words, without modifying it), without the node BCS2-A being able to detect it.

If the identifiers are different (i.e. the identifier of the node for which it has received the request does not coincide with one of the identifiers associated with the nodes capable of processing the parameter P), the node BCS2-A does not activate the parameter P in the failure response but transmits it unchanged to the node BCS1-A (step E60).

Since the identifier of the node BCS1-A is here included in the Supported header, the criterion c is checked, and the node BCS2-A activates the parameter P in the failure response 480 (step E70).

More specifically, in the example envisaged here, the node BCS2-A inserts the parameter P into the failure response 480. The parameter P is inserted as a new header of the failure response. As a variant, it may be a new field inserted into a header of the failure response, or a new item inserted into the body of the failure response.

The insertion of the parameter in the header constitutes an activation of this parameter in the sense of the invention. Advantageously, the value of the duly inserted parameter P may depend on the cause or on the nature of the obstruction. For example, and purely as an illustration:

P=1 in case of overload,

P=2 in case of unusable line.

The failure response 480 containing the parameter P is then sent to the node BCS1-A (step E80). This response is conveyed over the network in a signal according to the invention.

As a variant, the criterion c can be checked using a precompiled static list stored in the node BCS2-A, this list comprising the identifiers of the nodes of the network NW implementing the processing method according to the invention. This list will, however, have to be updated as changes are made that affect the nodes, such as, for example, changes of software version of the nodes or of network topology.

Referring to FIG. 6, on reception of the failure response 480 (step F10), the node BCS1-A determines whether the latter contains the parameter P authorizing it to perform a rerouting (i.e. if the parameter P is activated in the failure response received) (step F20).

If the failure response 480 does not contain the parameter P, then the node BCS1-A transmits this response to the node immediately upstream (identified in the Via header of the request S), without attempting any rerouting of the request S (step F30).

Since the failure response 480 here contains the parameter P, the node BCS1-A then searches, in its routing table, for another route for the request S (step F40), that is to say, a node distinct from the node BCS2-A, to which to reroute the SIP request S.

If no alternative node has been able to be identified during this search step (step F50), the node BCS1-A here deletes the parameter P from the failure response 480 and transmits the duly modified request to the node immediately upstream (that is to say, to the node IMS-1), without attempting any rerouting of the request S (step F30). The deletion of the parameter P constitutes a step of deactivation of the parameter P in the sense of the invention.

As a variant, in another embodiment, the node BCS2-A not having been able to undertake the rerouting of the request because of the absence of an alternative route, transmits the failure response with the parameter P to the node IMS-1. The latter will then attempt, on reception of the failure response with the parameter P, a rerouting of the SIP request, and will delete the parameter P in case of failure of the rerouting in order to avoid cascaded reroutings.

Thus, according to the invention, the parameter P can advantageously be configured by the node receiving the failure response, so as to adapt the strategies for rerouting the request S notably to the topology of the network and to the state of the nodes of the network.

The search for an alternative node intrinsically constitutes a check on a predetermined criterion in the sense of the invention (i.e. presence of an alternative node for rerouting the request). Other criteria may as a variant be envisaged before deciding to deactivate the parameter P in the response, such as, in particular, the detection of a particular node. These criteria are intended to identify certain situations in which it may be relevant to attempt a rerouting via a node located upstream.

If at least one alternative node (i.e. a potential candidate of the rerouting) has been able to be identified by the node BCS2-A (step F50) during the search step, an operation for rerouting the request S, previously stored by the node BCS1-A, is undertaken by the node BCS1-A to the identified alternative node (step F60). This step is implemented according to mechanisms known to those skilled in the art and not described in more detail here. The same applies to the choice of the node from the candidates for routing in cases of a plurality of available candidates.

In the example envisaged here (see FIG. 4), the node BCS1-A determines that the node BCS2-B is a potential candidate for the rerouting.

There are then two possibilities (step F70):

either the request S is processed by the node BCS2-B: it is then transmitted to the node IMS-2 for routing to the client C2 (step F80);

or, following the rerouting to the node BCS2-B, the node BCS1-A receives a new failure response, sent this time by the node to which the rerouting has been made (i.e. the node BCS2-B) (step F70): a new potential candidate for the rerouting, identified during the search step F40, is then considered and the steps F60-F90 are repeated.

If, however, all the candidate nodes identified in the search step have been tested (step F90) and have transmitted to the node BCS1-A a failure response notifying an obstruction to processing the request S, the node BCS1-A deletes the parameter P from the failure response 480 received previously (step F100). This deletion step is a step of deactivation of the parameter P in the sense of the invention.

It then sends the failure response 480, without the parameter P, to the node immediately upstream and for which it has received the request S, namely the node IMS-1 (step F110).

The latter, receiving the failure response without the parameter P, does not attempt any rerouting of the request, but relays the failure response unchanged to the client C1.

It will be noted that, in the example envisaged here, the node BCS1-A is not the node originating the SIP request S, i.e., it has received this request from the node IMS-1A, which itself has received the request from the node C1. If it is assumed, in another example, that the node BCS1-A is the node originating the request S, and that any rerouting attempt undertaken by the node BCS1-A following the reception of the response 480 fails, then the node BCS1-A notifies this failure to the entities affected by the failure of the transmission of the request S.

It will also be noted, in the embodiment described here, the parameter P is deactivated in the SIP failure response 480 transmitted by the node BCS2-A to the node BCS1-A, before it is sent to the node IMS-1. However, equivalently, the node BCS1-A may deactivate the parameter P (in other words here, not inserted) in the SIP failure response received from the node BCS2-B in the step E70, and transfer this response to the node IMS-1. As a variant, it may also deactivate this parameter in a new SIP failure response that it transmits to the node IMS-1.

What is claimed is:

1. A method for sending an SIP response by a first node of a telecommunication network, the method comprising:
   receiving, by the first node, a session initiation protocol (SIP) request sent by a second node of the telecommunication network;
   detecting an event obstructing a processing of the SIP request by the first node; and
   sending, to the second node, a SIP response notifying this obstruction, wherein before sending the SIP response, a parameter in the SIP response is activated by the first node, the activated parameter indicating consent of the first node to rerouting of the SIP request by the second node or another upstream node and which can be configured by the second node.

2. The method as in claim 1, further comprising verifying the validity of at least one predetermined criterion after detecting the event.

3. The method as in claim 2, wherein during the verifying, a criterion is considered that is linked to a cause of the obstruction.

4. The method as in claim 2, wherein during the verifying, a criterion is considered which is linked to a capacity of the second node to process the parameter.

5. The method as in claim 4, wherein the validity of the criterion linked to the capacity of the second node to process the parameter is checked by using an indication contained in the SIP request and an identifier of the second node.

6. The method as in claim 1, wherein a value of the parameter depends on a cause of the obstruction.

7. A non-transitory computer readable storage medium comprising instructions executable by a processor of an apparatus, the instructions causing the apparatus to execute the method of claim 1.

8. A method for processing a session initiation protocol (SIP) response, the method implemented by a first node of a telecommunication network after having transferred, to a second node of the telecommunication network, a SIP request received from a third node, the SIP response being received from the second node and notifying the first node of an obstruction to processing of the SIP request by the second node, the method comprising:
- if the SIP response received from the second node contains an activated parameter authorizing a rerouting of the SIP request and which can be configured by the first node to:
  - search for at least one fourth node to which to reroute the SIP request; and
  - reroute of the SIP request to the at least one fourth node, where appropriate;
- if the first node is notified of an obstruction to a processing of the SIP request by the at least one fourth node, sending, to the third node, a SIP response notifying the latter of an obstruction to a processing of the request, in which the parameter is deactivated; and
- otherwise, transferring the SIP response received from the second node to the third node.

9. The method as in claim 8, further comprising, if the search fails to identify at least one fourth node:
- deactivating the parameter in the SIP response received from the second node; and
- sending the duly modified SIP response to the third node.

10. The method as in claim 8, further comprising, when the SIP response received from the second node contains the activated parameter, checking the validity of at least one predetermined criterion, and, if the at least one criterion is valid, sending, to the third node, an SIP response notifying the latter of an obstruction to a processing of the SIP request, in which the parameter is activated.

11. A non-transitory computer readable storage medium comprising instructions executable by a processor of an apparatus, after transferring, from a first node of a telecommunication network to a second node of the telecommunication network, a session initiation protocol (SIP) request received from a third node, and after receiving a SIP response from the second node and notifying the first node of an obstruction to processing of the SIP request by the second node, the instructions cause the apparatus to execute the method of claim 8.

12. A device for sending a session initiation protocol (SIP) response in a telecommunication network, the device comprising:
- means for receiving a SIP request sent by a second device of the network;
- means for detecting an event obstructing a processing of the SIP request by said device;
- means for sending, to the second device, a SIP response notifying this obstruction; and
- means for activating, in the SIP response, before the SIP response is sent to said second device, a parameter, the activated parameter indicating consent of the device to rerouting of the SIP request by the second device or another upstream node and which can be configured by the second device.

13. A device for processing a SIP response of a telecommunication network, the device comprising:
- a processor;
- a non-transitory computer readable medium, wherein the processor is configured to execute software codes stored on the non-transitory computer readable medium, said software codes comprising:
  - software code configured to process the SIP response after having transferred, to a second device of the network, a SIP request received from a third device, the response being received from the second device and notifying the processing device of an obstruction to a processing of the SIP request by the second device;
  - software code configured to send for at least one fourth device to which to reroute the request and to reroute the request to the at least one fourth device, where appropriate, and being activated if the response received from the second device contains an activated parameter authorizing a rerouting of the SIP request, and being configurable by the second device;
  - software code configured to send a SIP response to the third device, the SIP response notifying the third device of an obstruction to processing of the request in which the parameter is deactivated, the software code configured to send the SIP response activated if, in addition, the processing device is notified of an obstruction to a processing of the SIP request by said at least one fourth device; and
  - software code configured to transfer the response received from the second device to the third device, and being activated when the searching and routing software and the sending software are inactive.

14. A system of a telecommunication network, comprising:
- at least one source element;
- a destination element configured for exchanging a SIP request; and
- a plurality of intermediate nodes through which the SIP request passes between the source element and the destination element, wherein at least one of the intermediate nodes of the system is a sending device comprising:
  - means for receiving a SIP request sent by another intermediate node of the network;
  - means for detecting an event obstructing a processing of the SIP request by said sending device;
  - means for sending, to the other intermediate node, a SIP response notifying this obstruction; and
  - means for activating, in the SIP response, before the SIP response is sent to the other intermediate node, a parameter authorizing a rerouting and which can be configured by the other intermediate node; and
- wherein the other intermediate node of the system is a processing device comprising:
  - processing software configured to process said SIP response after having transferred, to the sending device, the SIP request received from a third intermediate node, the response being received from the sending device and notifying the processing device of an obstruction to a processing of the SIP request by the sending device;
  - searching software for at least one fourth device to which to reroute the request and for rerouting the request to the at least one fourth device, where appropriate, the searching and routing software being activated if the response received from the sending device contains the activated parameter authorizing a rerouting of the SIP request, and the searching and routing software being configurable by the sending device;
  - sending software to send the SIP response to the third device, the SIP response notifying the third intermediate node of an obstruction to processing of the request in which said parameter is deactivated, and sending the SIP response activated if, in addition, the processing device is notified of an obstruction to a processing of the SIP request by the at least one fourth device; and
  - transferring software to transfer the response received from the sending device to the third intermediate node, and being activated when the searching and routing software and the sending software are inactive.

15. A signal generator comprising:
 a receiver configured to obtain:
  a session initiation protocol (SIP) request sent to a first node from a second node; and
  an indication of an obstruction by the first node to processing the SIP request; and
 a response generator configured to:
  generate a SIP response; and
  activate a parameter in the SIP response based on the indication, the parameter indicating consent of the first node to rerouting of the SIP request by the second node or another upstream node and which can be configured by the second node.

* * * * *